Patented Dec. 2, 1952

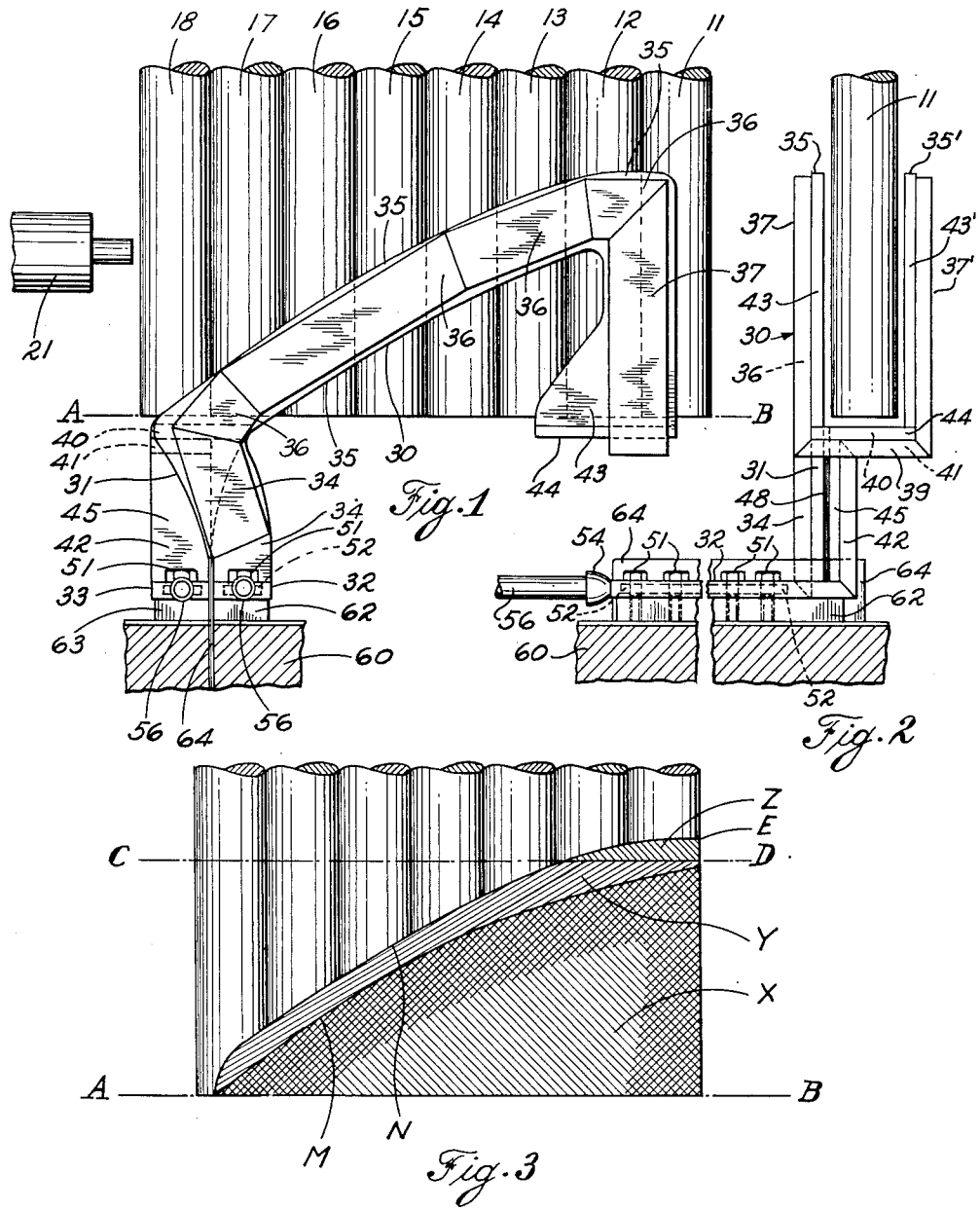

2,620,432

UNITED STATES PATENT OFFICE 2,620,432

INDUCTION HEATING

Norbert E. Foxx, Cleveland, Ohio, assignor to Republic Steel Corporation, Cleveland, Ohio, a corporation of New Jersey Application November 30, 1949, Serial No. 130,309

11 Claims. (Cl. 219—47)

This invention relates generally to the art of metal heating and more particularly to the heating of an end portion of an elongated metal shape such, for example, as a section of rod or bar stock or tubing.

The nature and significance of the invention may be more clearly understood after consideration of an industrial problem to which it presents a solution.

In the production of bolts, for example, bar stock is cut into lengths appropriate to form the body and head of the bolt. When a hot heading process is employed, one end of the work piece is heated and is then upset to form the head of the bolt. Heretofore, this heating was accomplished by exposing the ends of the work pieces to heat in a furnace. This method was unsatisfactory, since much heat flowed by conduction into parts of the work pieces where it was not desired and where upsetting occurred during the heading operation. In other words, it was impossible to heat to upsetting temperature only that part of the stock which was to be headed and consequently the work pieces had to be cut longer than would have been necessary if the heat could have been localized.

In an effort to overcome the disadvantages of furnace heating, induction heating has been employed. While such heating made possible a better control of the heating it possessed to a considerable degree the old difficulty arising from conduction of heat from the part of the piece to be headed to the neighboring portion; that is, the waste in electrical power and metal due to loss of heat to the portion of the stock which should not be worked.

The present invention aims to avoid these and other disadvantages and faults of the prior art and achieves its aim by greatly reducing the length of the transition zone and by minimizing conduction of heat to the portion of the work piece which is not to be headed. In this way, the efficiency of heating is substantially increased and important economies in material are realized, since a shorter work piece may be used.

The saving of stock varies, of course, with the size of the stock and other conditions, but as an average value it has been found that the invention permits the work piece to be one-tenth inch shorter for each bolt made. It will be obvious that in operations where bolt production runs into millions this saving is of great importance.

The fundamental principle of the invention lies in the concept of employing induction heating in such a manner that heat is applied to the work piece progressively from the end of the work piece inwardly to the other end of the portion which is to be heated. In the working embodiment of the invention this result is achieved by utilizing an induction heating coil so formed and so disposed relatively to the path of the work piece through the heating apparatus that the inductive effect is initiated at the end of the work piece as it enters the apparatus and the locus of application of energy progresses from the end of the work piece to the other end of the portion to be heated as it moves through the heating apparatus, as will be fully explained in the subsequent description.

The manner in which the stated objects are achieved and various additional objects and advantages of the invention, more or less ancillary in nature, will be apparent to those skilled in the art from the accompanying drawings and the appended description of the preferred embodiment of the invention.

Referring to the drawings, Fig. 1 is a side view of an apparatus in accordance with the invention, Fig. 2 is an end view of the same, and Fig. 3 is a diagram illustrating the principles and advantages of the invention.

In Figs. 1 and 2, the invention is illustrated as embodied in apparatus for heating the end portions of sections of rod or bar stock which are to be formed into bolts by a hot heading process immediately after the heating. The end portions of a number of pieces of bar stock, identified as 11 to 18, inclusive, are illustrated progressing through the heating apparatus. The work pieces are moved progressively from left to right, as shown in Fig. 1, by a pusher 21 which may be reciprocated in any suitable manner. As the work pieces are advanced, additional work pieces are introduced at the left, and as the work pieces are delivered at the right in Fig. 1, they may be conveyed or transferred to the header by any suitable means (not shown). The work pieces may be guided in their movement through the heating apparatus by a suitable supporting or carrying structure, which is not shown, since the details thereof, as well as the details of the mechanisms by which the movement is effected, are not material to the invention.

The ends of the work pieces 11 to 18 move along the line A—B indicated in Figs. 1 and 3. The heating coil, indicated generally as 30, is copper strap backed by copper tubing of rectangular form for circulation of cooling fluid, preferably with the greater dimension at least several times the lesser dimension.

The solid conductor portion of the coil may be cut from sheet copper to the desired form and may be composed of several sections brazed or otherwise united. The copper tubing, which backs up the conductor and cools it, may be made from sections of rectangular copper tubing silver-soldered together and silver-soldered to the solid conductor to obtain maximum heat transfer. In the preferred embodiment of the invention, the tubing constitutes the lead-in sections of the coil, although the power may be supplied directly to the solid conductor if desired.

More specifically, the coil comprises parallel hollow terminal sections 32 and 33 which lie closely adjacent to each other and are mounted directly on the terminals 62 and 63 of the high-frequency current source 60. The terminal section 32 connects to a section 34 leading toward the line A—B, which is backed by the end portion 31 of the solid conductor. This end portion conducts into an arcuate section 35 of the solid conductor which is backed by a series of sections 36 of the tubing. The solid conductor 35 continues into a portion 43 directed toward the line A—B, the lower portion of which, adjacent the ends of the rods, is broadened to secure more uniform heat distribution. A tubular section 37 lies against the conductor 43. A second solid conductor comprising sections 43' and 35', of the same form as sections 45 and 43, visible in Fig. 1, lies on the opposite side of the work pieces and is cooled by tube sections 37' and 36' (not shown) in the same manner as the other section of conductor. The two lengths 43 and 43' are joined by a section of solid conductor 44 brazed thereto and cooled by a section 39 of tubing which joins the tube sections 37 and 37'. At the entrance end of the conductor 36', it connects to a conductor section 40 which lies behind the conductor section 44 in Fig. 2 and the conductor section 31 in Fig. 1, and which passes across under the ends of the work pieces. The conductor section 40 is brazed to a section of solid conductor 45 extending downwardly towards the terminal section. The conductor sections 40 and 45 are cooled by tubing sections 41 and 42, respectively. The sections 31 and 45 are insulated from each other by a sheet of mica or similar material identified as 46. The tubing section 42 is brazed to the terminal section 33, thus completing the circuit for both electric current and cooling fluid.

The terminal portions 32 and 33 are drilled to receive cap screws 51 by which they are bolted to the terminals 62 and 63 of the power supply device 60. The conductor sections are reinforced by metal pads 52 inserted between the faces of the conductors and likewise drilled for the screws 51, which pads resist the compressive effect of the cap screws on the conductor. The pads are of less width than the fluid passage in the conductor so that fluid may flow around the sides of the pads. The ends of the terminal sections 32 and 33 are fitted with adapters 54 into which water supply and return conduits 56 may be secured.

The terminals 62 and 63 and the terminal portions 32 and 33 of the coil are insulated by a sheet 64 of mica or other suitable material.

The power supply device 60 may be a high-frequency generator or a matching transformer. It is not shown in detail, since sources of high-frequency current for induction heating are well known and the construction of the generator or transformer is not material to the invention.

It will be noted that the coil sections 35 and 35' are of generally arcuate form, so that the zone of greatest heating of the work, immediately between these sections, progresses more slowly along the work piece as the displacement of the zone from the end of the work piece increases. It has been found that this arrangement gives a more uniform distribution of heat in the work piece. Of course, this result could be obtained with straight coil sections 35 and 35' by moving the work pieces along a curved path. It could also be obtained in other ways, but that illustrated is preferred.

The diagram of Fig. 3 illustrates the nature of the heating operation performed by the invention in a graphic form. A typical position of the rod sections is illustrated. The ends of the rods progress along the line A—B and the end portion of the rods, which is to be heated, is that between the line A—B and the line C—D. The area of the chart identified as X is bounded by the curved line M which follows the upper edges of the sections 35 and 35' of the coil, the doubly shaded portion of area X indicating the zone of principal heat supply immediately adjacent the coil as the work pieces progress through the coil.

The area X thus represents the area heated directly by the coil. The areas Y and Z lying between the line M and the line N represent heating by conduction inwardly of the stock from the part heated directly by the coil. The heat represented by the area Y, which is below the line C—D, is useful. Only the small amount of heat represented by the area Z, which lies beyond the line C—D, is wasted. Because of the progressive heating of the stock, most of the conducted heat is conducted into the portion of the stock which is to be heated, and since the portion of the stock adjacent the line C—D is only heated during the last stages of the heating operation there is very little time for conduction of heat beyond the line C—D. The undesired heated zone is very short, being represented in the diagram by the distance between the line C—D and the point E.

The extreme end of the work piece is subjected to an intense heating field by the transverse portion 40 of the coil as it enters the apparatus. The entire portion to be headed is given a final heating over the entire length by the portions 43, 44 and 43' of the coil at it leaves the coil, which equalizes the heat over the entire end portion. The widening of the conductors 43, 44, and 43' adjacent the end of the work pieces has been found to give improved heat distribution in the particular industrial application described herein.

The advantages of the invention may be pointed out in connection with the gain over induction heating arrangements previously employed which have been supplanted by the invention. A multi-turn coil with end sections parallel to the length of the work pieces and intermediate sections parallel to the line A—B was employed, but was found to be unsatisfactory for a wide range of diameters, to be inefficient, and to give rise to maintenance difficulties. The multi-turn coils are easily damaged and difficult to repair. In view of these disadvantages of the multi-turn coil, a single-turn coil was developed. This coil turn was formed with sections disposed substantially along the line indicated as C—D and with sections at each end perpendicular to the line A—B. While this coil had advantages in terms of maintenance and efficiency over the multi-turn coil, it caused excessive temperature rise in the portion of the bar which was not to be upset. The present invention eliminates this defect as well as the defects of multi-turn coils.

The advantages of the invention may be further indicated by a comparison of the operating characteristics in actual use of the coil described herein and the coil in which the ends of the coil are parallel to the ends of the bars being heated and the central portion is parallel to the direction of movement of the bars. In both cases, a 2½ inch section of the end of the bar was heated to 2100 degrees F. With the coil of the invention, this was accomplished in four seconds, whereas with the previous coil, six seconds was required. The power consumption was approximately the same, being 62 kw. for the new coil as against 60 kw. for the previous coil. Since the time is shorter, the energy used by the new coil was much less, being 69 watt-hours as against 100 watt-hours for the previous coil. Thus, the new coil of the invention requires only about seven-tenths as much energy, which provides for a saving in the power consumption and in the cost of the power supply equipment.

Even more important, the decrease of approximately one-third in the heating time makes it possible to keep up with the speed of the heading machine with bars of such size that they could not be heated rapidly enough with the previous equipment.

In addition, as previously stated, since the transition zone of heated stock beyond the portion to be headed is extremely short, more precise heading is accomplished and it has been found possible to use a shorter section of stock for a given bolt, the saving in length generally varying from $\frac{1}{16}$ to $\frac{1}{8}$ inch, depending on the size of the stock.

While the single-turn coil is preferred, it will be apparent that the principles of the invention are applicable to multi-turn coils, and that a multi-turn coil induction heating device employing the progressive heating principle will be superior to devices with previously known heating coils.

It will be apparent to those skilled in the art that the invention is capable of various modifications within the scope thereof, which is not to be considered as limited by the description herein of the preferred embodiment of the invention.

I claim:

1. A method of inductively heating the end portion of an elongated metal work piece comprising energizing a coil with high-frequency current, relatively moving the work piece and coil so that the zone of greatest induction in the work piece moves progressively from the end of the piece to the inner end of the portion to be heated, then abruptly terminating the inductive relation between the coil and work piece, in which the rate of progression of the said zone decreases as the displacement thereof from the end of the work piece increases.

2. An induction heating apparatus for heating the end portion of elongated metal work pieces comprising, in combination, means for feeding the pieces transversely of the long dimension thereof so that the ends of the pieces follow a predetermined path, and a coil for heating the said end portion of the work pieces, the coil being of the single-turn type and comprising a section disposed on each side of the path of the work pieces extending at an angle to the said path substantially throughout the length of the section and inwardly of the pieces as they progress between the coil sections, the said two sections being adapted to be connected to high frequency current generating means at the entry end of the coil, and a section joining the said two sections at the exit end of the coil, the said last-named section being directed transversely across and adjacent the ends of the work piece.

3. An induction heating apparatus for heating the end portion of elongated metal work pieces comprising, in combination, means for feeding the pieces transversely of the long dimension thereof so that the ends of the pieces follow a predetermined path, and a coil for heating the said end portion of the work pieces, the coil comprising a section disposed on each side of the path of the work pieces extending at an angle to the said path substantially throughout the length of the section and inwardly of the pieces as they progress between the coil sections, a section connected to each of the two said sections and extending along the long dimension of the pieces so that the pieces move transversely thereof, and a section joining the ends of the two last-named sections, the joining section extending across and adjacent the ends of the work pieces.

4. A method of heating the end portion of an elongated metal work piece comprising moving the work piece transversely of its length so that the end thereof follows a predetermined path, inductively preheating a relatively narrow segment of the work piece, the segment heated moving inwardly from the end as the piece moves along the predetermined path, and inductively heating the entire end portion of the piece so preheated by an induction field of relatively high intensity.

5. A method of inductively heating a portion near the end of an elongated metal work piece comprising moving the work piece transversely of its length so that the portion to be heated follows a predetermined path, inductively preheating a relatively narrow segment of the work piece, the segment of preheating traversing the entire portion to be heated as the piece moves along the path, inductively heating the entire portion so preheated simultaneously, and inductively heating the end of the piece by an induction field of relatively high intensity to bring the portion to the desired temperature.

6. A method of heating a portion of an elongated work piece comprising moving the work piece transversely of its length so that the portion to be heated follows a predetermined path, inductively preheating a relatively narrow segment of the work piece, the segment of preheating traversing the entire portion of the piece to be heated as the piece moves along the path, and inductively heating the portion of the piece so preheated by an induction field of relatively high intensity.

7. The method of heating a work piece which comprises moving the piece along a predetermined path, inductively preheating a relatively narrow segment of the piece, the segment heated moving along the piece in a direction generally normal to the path of travel as the piece moves along the path, and inductively heating the entire portion so preheated by an induction field of relatively high intensity.

8. The method of heating the end portion of an elongated work piece which comprises moving the work piece transversely of its length so that the end thereof follows a predetermined path, inductively preheating the end of the work piece, then inductively preheating a relatively narrow segment of the work piece, the segment heated moving inwardly from the end as the piece moves along the path, and inductively heating the entire end portion of the piece so preheated by an induction field of relatively high intensity.

9. The method of heating a portion of a work piece which comprises inductively preheating a segment of the portion with an induction field of relatively high intensity and of limited extent relative to the portion to be heated, preheating the entire portion by moving the piece so that the field traverses the entire portion to be heated, and inductively heating the entire portion so preheated by an induction field extending substantially simultaneously over the entire portion.

10. An induction heating apparatus for heating portions of elongated work pieces comprising in combination means for feeding the pieces transversely of the length thereof along a substantially uniform path, and a coil for heating the said portions of the work pieces, the said coil comprising a section disposed on each side of the pieces, the sections being relatively narrow and extending diagonally in the direction of feed of the pieces and in the direction of the length of the pieces, the sections having an entry end and an exit end for the pieces, the entry end of the sections being adapted to be connected to a generator for high frequency currents, a section connected to each of said sections near the exit end thereof and directed along the length of the pieces, the said last-named sections extending beyond the ends of the pieces, and a section connected to the said last-named sections and extending across the path of the pieces.

11. The invention in accordance with claim 10, the said sections extending along the length of the pieces including widened portions near the ends of the pieces.

NORBERT E. FOXX.

REFERENCES CITED

The following references are of record in the file of this patent:

UNITED STATES PATENTS

| Number | Name | Date |
| --- | --- | --- |
| 2,275,763 | Howard et al. | Mar. 10, 1942 |
| 2,288,644 | Purtell | July 7, 1942 |
| 2,308,240 | Goodridge | Jan. 12, 1943 |
| 2,428,303 | Wood | Sept. 30, 1947 |
| 2,456,962 | Lee | Dec. 21, 1948 |
| 2,460,687 | Fuchs | Feb. 1, 1949 |
| 2,475,348 | Black | July 5, 1949 |
| 2,575,504 | Wright | Nov. 20, 1951 |

OTHER REFERENCES

Survey of Modern Electronics by Paul G. Andres, July 1950, John Wiley and Sons, New York, page 474.